United States Patent
Gupta et al.

(10) Patent No.: US 10,523,516 B1
(45) Date of Patent: Dec. 31, 2019

(54) CHANGE CRITICALITY QUANTIFIER FOR AN IOT WORKSPACE AND ASSOCIATED METHODS

(71) Applicant: CITRIX SYSTEMS, INC., Fort Lauderdale, FL (US)

(72) Inventors: Anup Lal Gupta, Karnataka (IN); Praveen Raja Dhanabalan, Karnataka (IN); Akshata Bhat, Karnataka (IN); Jaskirat Chauhan, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/029,875

(22) Filed: Jul. 9, 2018

(51) Int. Cl.
*H04L 12/24* (2006.01)

(52) U.S. Cl.
CPC .............. *H04L 41/12* (2013.01); *H04L 41/14* (2013.01)

(58) Field of Classification Search
CPC ........................................................ H04L 41/12
USPC ........................................................ 370/254
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 2010/0299419 A1* | 11/2010 | Ramankutty | H04W 24/02 709/221 |
| 2016/0088424 A1* | 3/2016 | Polo | H04W 4/80 455/41.1 |
| 2016/0147211 A1* | 5/2016 | Kore | G05B 19/0426 700/83 |
| 2016/0150362 A1* | 5/2016 | Shaprio | H05K 1/0278 340/539.13 |
| 2018/0332434 A1* | 11/2018 | Kulkarni | H04L 67/22 |
| 2019/0182119 A1* | 6/2019 | Ratkovic | H04L 41/145 |
| 2019/0182627 A1* | 6/2019 | Thoresen | H04W 4/029 |

* cited by examiner

*Primary Examiner* — Peter G Solinsky
(74) *Attorney, Agent, or Firm* — Allen, Dyer, Doppelt + Gilchrist, PA

(57) ABSTRACT

A device for an Internet of Things (IoT) workspace monitors the IoT workspace to determine a change in a number of IoT devices operating within the IoT workspace. A respective topology of the IoT workspace is determined based the number of IoT devices operating in the IoT workspace. The IoT devices based on each topology are mapped, with each map identifying locations of the IoT devices within the IoT workspace. Relationships and dependencies are determined between the IoT devices for each map. A weight is assigned to each IoT device based on the determined relationships and dependencies for each map. The assigned weights of the changed number of IoT devices are compared to the assigned weights of the IoT devices operating before the change so as to quantify an impact of the change in the IoT workspace.

19 Claims, 6 Drawing Sheets

CHANGE CRITICALITY QUANTIFIER FOR AN IOT WORKSPACE AND ASSOCIATED METHODS

TECHNICAL FIELD

The present disclosure relates to Internet of Things (IoT) workspaces, and more particularly, to quantifying the impact of changes in an IoT workspace.

BACKGROUND

An IoT workspace provides significant value by utilizing collaboration among IoT devices operating within the workspace. However, reliable operation of an IoT workspace requires continuous monitoring of failures and changes in the IoT environment. This becomes more complicated in mobile workspaces or flexible workspaces, such as hospitals and transportation.

Mobile workspace deployments of IoT devices are very dynamic in nature as various aspects of the environment tend to change. For instance, new IoT devices may be added, existing IoT devices may be removed, and equipment failure/power drain are example changes in an IoT workspace. It is well understood that, without tracking these variations in an IoT environment, an administrator cannot ensure reliable functioning of the IoT workspace. Each change in an IoT workspace can have a different impact on the functioning and stability of the IoT workspace.

SUMMARY

A device for an IoT workspace comprises a health monitor to monitor the IoT workspace and determine when there is a change in a number of IoT devices operating within the IoT workspace, and a topology scanner coupled to the health monitor to determine a respective topology of the IoT workspace based the number of IoT devices operating in the IoT workspace. A device mapper is coupled to the topology scanner to map the IoT devices based on each topology, with each map identifying locations of the IoT devices within the IoT workspace. A change interpreter is coupled to the device mapper to determine relationships and dependencies between the IoT devices for each map, and assign a weight to each IoT device based on the determined relationships and dependencies for each map.

A criticality calculator is coupled to the health monitor and to the change interpreter, and compares the assigned weights of IoT devices operating in the IoT workspace before the change and after the change so as to quantify an impact of the change in the IoT workspace. The impact of the change in the IoT workspace as quantified by the criticality calculator is reflective on how an overall stability of the IoT workspace is affected.

The change interpreter is further configured to determine a minimum combination of IoT devices that are needed to maintain stability of the IoT workspace. The criticality calculator uses the minimum combination along with the assigned weights for each IoT device when quantifying the impact of the change in the IoT workspace.

The criticality calculator is further configured to generate a change criticality message based on the quantified impact of the change in the IoT workspace. The change criticality message advantageously allows an administrator to take corrective action if the change is severe or critical.

The change interpreter is further configured to generate a dependency graph for each map based on the determined relationships and dependencies between the IoT devices, and wherein assigning the weight to each IoT device for each map is also based on the dependency graph.

The health monitor continuously monitors for any change in the IoT workspace, and when there is a change, reports the change to the criticality calculator.

The health monitor polls the IoT devices within the IoT workspace with a health check command, with each polled IoT device responding with a heartbeat signal that includes their address. The health monitor provides a list of addresses for the IoT devices within the Iot workspace to the topology scanner, and provides the number of IoT devices within the IoT workspace to the criticality calculator.

Another aspect is directed to a method for operating a device for an IoT workspace comprising monitoring the IoT workspace and determine when there is a change in a number of IoT devices operating within the IoT workspace, determining a respective topology of the IoT workspace based the number of IoT devices operating in the IoT workspace, and mapping the IoT devices based on each topology. Each map identifies locations of the IoT devices within the IoT workspace. Relationships and dependencies between the IoT devices for each map are determined. A weight is assigned to each IoT device based on the determined relationships and dependencies for each map. The assigned weights of IoT devices operating in the IoT workspace are compared before the change and after the change so as to quantify an impact of the change in the IoT workspace.

Yet another aspect is directed to a non-transitory computer readable medium for operating a device for an IoT workspace, and with the non-transitory computer readable medium having a plurality of computer executable instructions for causing the device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
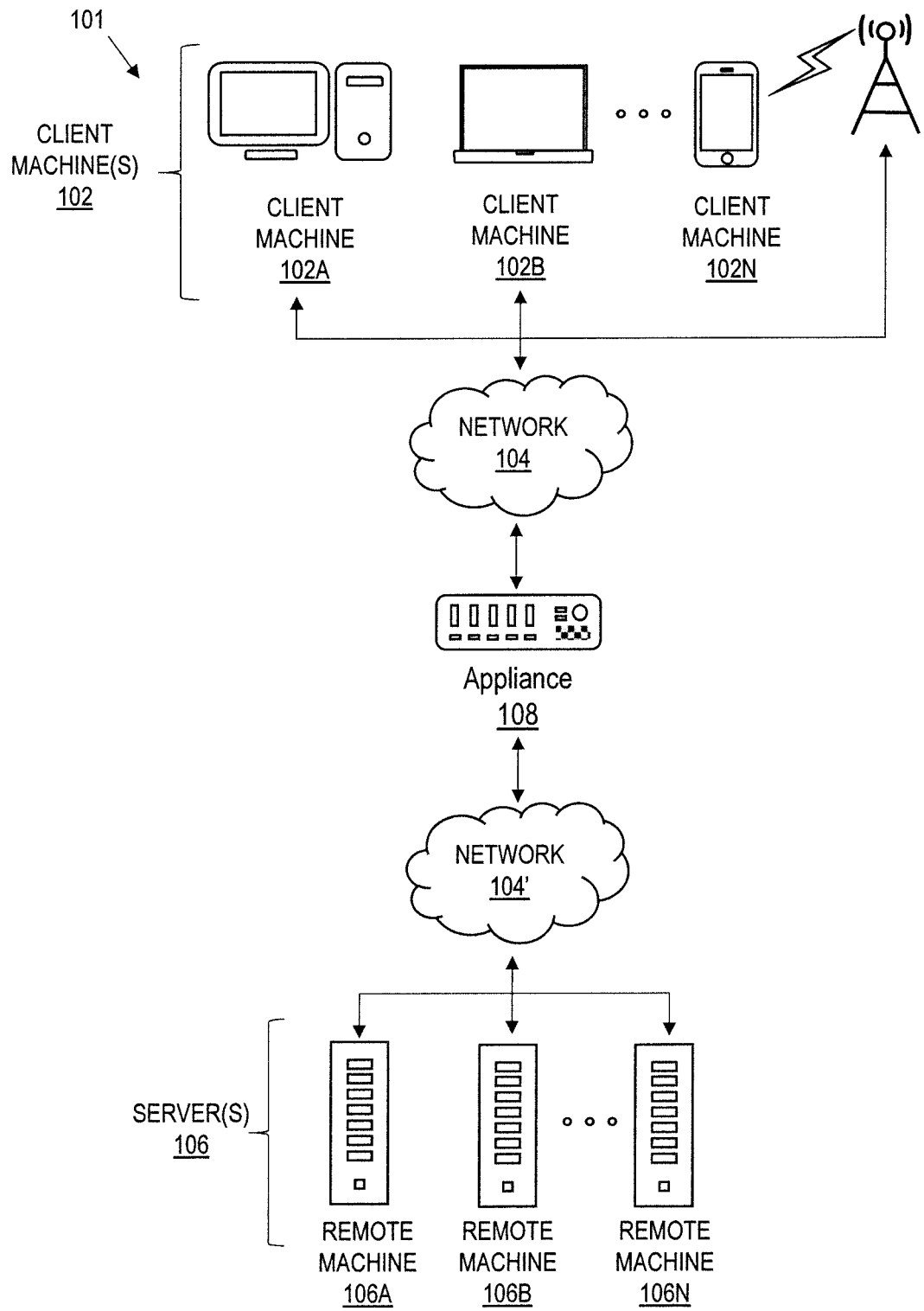
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
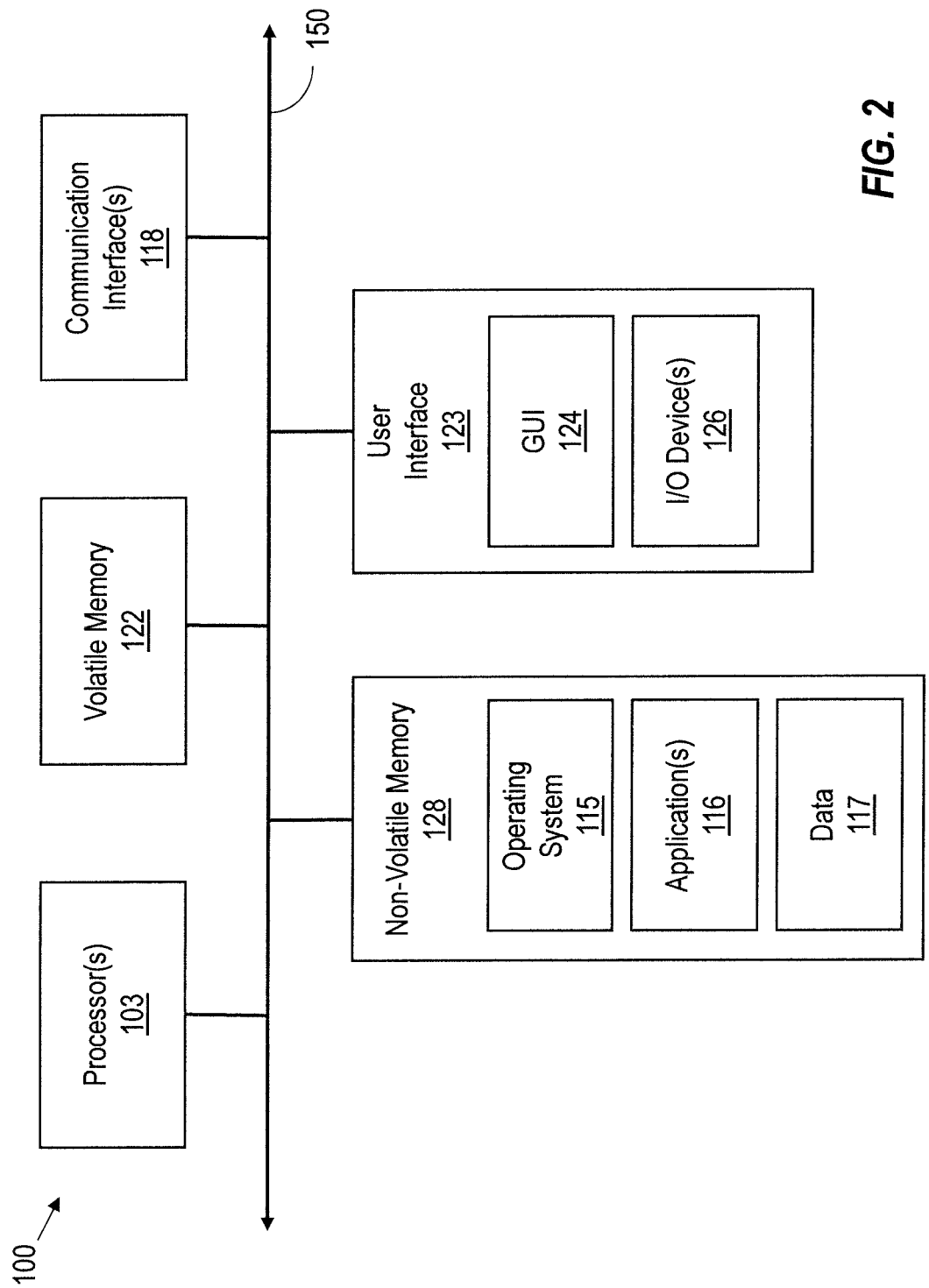
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
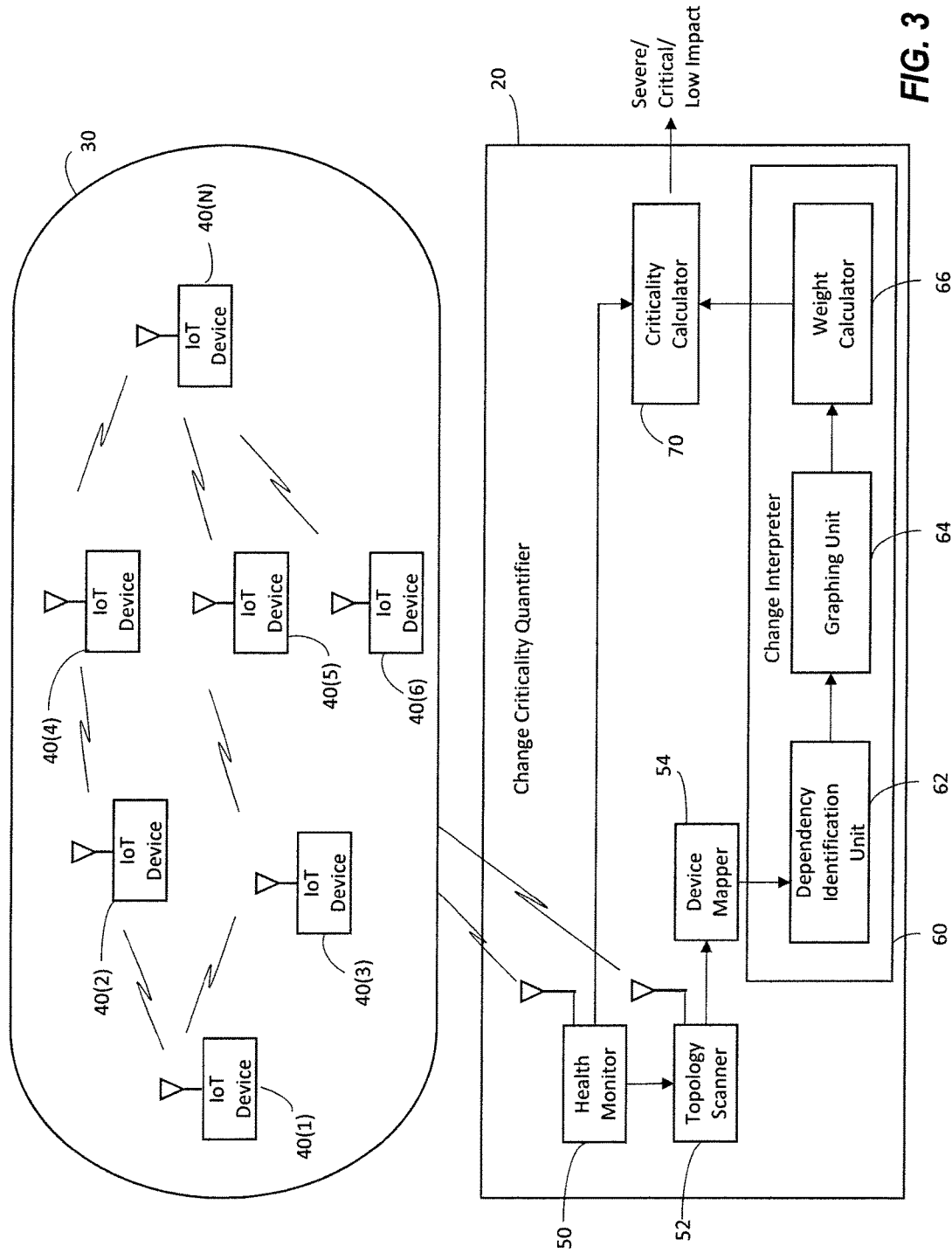
FIG. 3 is a block diagram of a change criticality quantifier for an Internet of Things (IoT) workspace in which various aspects of the disclosure may be implemented.

Referring initially to FIG. 3, a change criticality quantifier 20 for an Internet of Things (IoT) workspace 30 will be discussed. The change criticality quantifier 20 may also be referred to as a device. The IoT workspace 30 includes IoT devices 40(1)-40(n) interacting with one another. The IoT devices 40(1)-40(n) may be generally referred to as an IoT device 40.

As noted in the background, reliable operation of an IoT workspace 30 requires continuous monitoring of changes to the IoT devices 40. An administrator cannot ensure reliable functioning of the IoT workspace 30 without tracking these variations. Each change in an IoT workspace 30 can have a different impact on the functioning and stability of the IoT workspace 30. This is particularly so when IoT devices 40 are dependent on other IoT devices 40.

As will be explained in detail below, the change criticality quantifier 20 advantageously quantifies the impact of changes among the IoT devices 40 operating within the IoT workspace 30. If the change criticality quantifier 20 determines a change in the IoT workspace 30 is critical in terms of impacting the functioning and stability of the IoT workspace 30, then an administrator would be notified to take corrective action. Alternatively, an automated response may be taken to address the change impact.

Mobile workspace deployments of IoT devices 40 may be very dynamic in nature as various aspects of the environment tend to change. This dynamic setup may rely on collaboration of IoT devices 40 to provide many valuable functional offerings. The collaboration could be of various types.

One type of collaboration is dependent IoT devices 40 working in coordination with peer IoT devices 40 so that a segment of workflow is completed by a set of IoT devices 40, followed by passing on the control to other IoT devices 40 to complete the flow. Non-dependent IoT devices 40, which share responsibility, load balance the work among themselves. These IoT devices 40 are generally homogenous unlike dependent IoT devices 40.

Such a collaboration of dependent IoT devices 40 may be found in the healthcare field, for example. A hospital can have an extremely dynamic mobile workspace with factors including a variable number of patients, doctors, nurses and other staff with their continuously changing location and availability. In this scenario there is a benefit to be gained from IoT deployment to track resources and ensure efficient collaboration among staffs with different roles.

In such a set up there may be a set of lab locator beacons and a patient assistance device which guides a patient to the lab. These two different IoT devices 40 are dependent on each other to complete this workflow. If one of the beacons installed in lab goes down it is worth noticing if there are other beacons which can take up this responsibility. If another beacon is available, then this is an example of load sharing among similar non-dependent IoT devices 40. The change criticality quantifier 20 would mark the change of the beacon failing as "low impact". However, if another beacon is not available, then there are not enough resources to complete this workflow. Consequently, the change criticality quantifier 20 would mark the change of the beacon failing as "severe".

Another example IoT workspace 30 includes 10 people inside a meeting room equipped with sensors to connect with attendees that are in range of the sensors. Sensors A, B and C are Bluetooth low energy (BLE) receivers, and together are able to sense all the attendees by receiving BLE advertisements broadcasted by the attendees' mobile phones. However, each BLE receiver can serve a subset of users located in an underlying coverage range. Assume sensor A is sensing attendees a1 through a6, sensor B is sensing attendees a3 to a10, and sensor C is sensing attendees a5 to a10.

In a scenario where, if either sensor B or C stops to work or has a battery drain this would not affect the working of a smart IoT workspace 30 because one of sensors B or C coupled with sensor A are capable enough to serve the functionality. However, for an IoT workspace change, where sensor A goes down or the situation of multiple failures where sensor B and C go down together, the change should be considered a critical or severe impact because of not having enough devices to cover every attendee.

These two types of IoT devices 40 working together are not exclusive. At each segment, a workflow of operation can be load balanced by many similar IoT devices 40 to optimally achieve the task. For instance, in the above example, if a beacon should go down, then IoT software may be intelligent enough to load balance the responsibility to another beacon.

In a manufacturing workspace scenario, a factory floor can be equipped with an IoT workspace 30 to achieve a smart assembly line. In such a setup, there may be a set of defect sensing devices, which are capable of identifying defects in production. The defect sensing devices then communicate to quality control supervisors through an alert mechanism, which may be composed of an alarm system and a positioning module that scans the IoT workplace 30 to find the nearest QA supervisor. In this example, the defect sensing device, the alarm device and the positioning devices are dependent IoT components, whereas there can be multiple alarm devices as well as positioning devices which are sharing the load to achieve the functionality.

The change criticality quantifier 20 for an IoT workspace 30 allows for a minimal subset of similar and different devices to be found, which are sufficient to carry out the intended goal reliably. Each change in this kind of IoT set up is measured against this minimal subset to understand the severity of impact on the overall IoT workspace 30. This also addresses the fact that the minimal subset of IoT devices 40 is very dynamic and ever changing for various reasons, such as an increase or reduction of workspace load, new employees, different coverage ranges of sensors and devices, etc.

The change criticality quantifier 20 includes a health monitor 50 configured to monitor the IoT workspace 30 to determine how many IoT devices 40 are operating, and with the monitoring including determining when there is a change in the number of IoT devices 40 that are operating. A topology scanner 52 is coupled to the health monitor 50 and is configured to determine a respective topology of the IoT workspace 30 based on how many IoT devices 40 are operating as determined by the health monitor 50.

A device mapper 54 is coupled to the topology scanner 52 and is configured to map the IoT devices 40 based on each topology, with each map identifying device types and locations of the IoT devices 40 within the IoT workspace 30. A change interpreter 60 is coupled to the device mapper 54 and is configured to determine relationships and dependencies between the IoT devices 40 for each map, and assign a weight to each IoT device 40 based on the determined relationships and dependencies for each map.

A criticality calculator 70 is coupled to the health monitor 50 and to the change interpreter 60. The criticality calculator 70 is configured to compare the assigned weights of the changed number of IoT devices 40 to the assigned weights of the IoT devices 40 operating before the change so as to quantify an impact of the change in the IoT workspace 30.

The impact of the change in the IoT workspace as quantified by the criticality calculator 70 is reflective on how an overall stability of the IoT workspace 30 is affected. The change interpreter 60 is configured to determine a minimum combination of IoT devices 40 that are needed to maintain stability of the IoT workspace 30. The criticality calculator 70 uses this minimum combination along with the assigned weights for each IoT device 40 when quantifying the impact of the change in the IoT workspace 30.

The health monitor 50 is a type of management device that polls the IoT devices 40 within the IoT workspace 30. Depending on the size of the IoT workspace 30, there may be multiple health monitors 50.

The polling is based on the health monitor 50 broadcasting a health check command. The IoT devices 40 within range of the health monitor 50 will respond back with a heart beat signal upon receiving the health check command. The heat beat signal lets the health monitor 50 know that a particular IoT device 40 is up or down. The heart beat signal may also be referred to as a signal.

The manufacturer of each IoT device 40 usually implements a basic health check response to health check commands. A basic health check response functioning as the heart beat signal includes a corresponding address of the IoT device 40 responding to the health check command.

The health monitor 50 is able to determine how many IoT devices 40 are operating within the IoT workspace 30 based on the number of addresses being tracked. The number of IoT devices 40 within the workspace 30 as determined by the health monitor 50 is provided to the criticality calculator 70, and a list of the addresses of the IoT devices 40 is provided to the topology scanner 52.

The health monitor 50 continuously monitors for any change in the IoT workspace 30, and when there is a change, reports the change to the criticality calculator 70. The health monitor 50 polls the IoT devices 40 so as to update the number of IoT devices should there be a change within the IoT workspace 30. When there is a change in the number of IoT devices operating within the IoT workspace 30, the health monitor 50 provides the update to the criticality calculator 70, as well as an updated list of the addresses of the IoT devices 40 to the topology scanner 52.

The topology scanner 52 intercepts traffic that is transmitted by the IoT devices 40 as identified on the list of the addresses of the IoT devices 40 provided by the health monitor 50. The intercepted traffic allows the topology scanner 52 to determine the different types of IoT devices 40 operating within the IoT workspace 30, and how the IoT devices 40 are connected 40 within the IoT workspace 30.

As discussed above, some IoT devices 40 may be dependent on other IoT devices 40. For example, a heart rate monitor may be attached to a patient in an intensive care unit (ICU), and an oxygen sensor controls a supply of oxygen to the patient based on the heart rate monitor. In this case, the heart rate monitor and the oxygen sensor are dependent on each other. A common standard protocol for IoT communications is MQTT. In a typical MQTT deployment, a dependency relationship may be determined by monitoring publishers and subscribers of a message type.

Other types of IoT devices 40 may be used for sharing/load balancing. In general, similar IoT devices 40 will be load balancing to achieve a task as a whole. These IoT devices 40 will have different capacities. For example, a healthcare facility such as a medical clinical may install 20 beacon or resource locator devices with different coverage ranges for 12 medical resources and facilities.

The medical resources and facilities may include a pathology lab, a scanning unit, an operation area, etc. Multiple of these devices collaborate to locate a place. If one of the 20 beacon or resource locator devices fails or is removed for maintenance, then this would not affect the operation due to load sharing with the of IoT devices 40.

The device mapper 54 receives each respective topology as determined by the topology scanner 52, and determines locations of the IoT devices 40 within the IoT workspace 30. Each topology provides how the IoT devices 40 are connected and the types of IoT devices 40, and the device mapper 52 then determines the locations of the IoT devices 40. Even though the topology scanner 52 and the device mapper 54 are shown as separate components, they may be packaged as a single component.

The change interpreter 60 includes a dependency identification unit 62, a graphing unit 64 and a weight calculator 66. The change interpreter 60 is coupled between the device mapper 54 and the criticality calculator 70.

The dependency identification unit 62 determines relationships and dependencies between the IoT devices 40 for each map. This determination is made based on locations of the IoT devices 40 as provided by the device mapper 54, and on the topology as provided by the topology scanner 52. The topology provides how the IoT device 40 are connected together, as well as the different types of IoT devices 40 operating within the IoT workspace 30.

Figure 4:
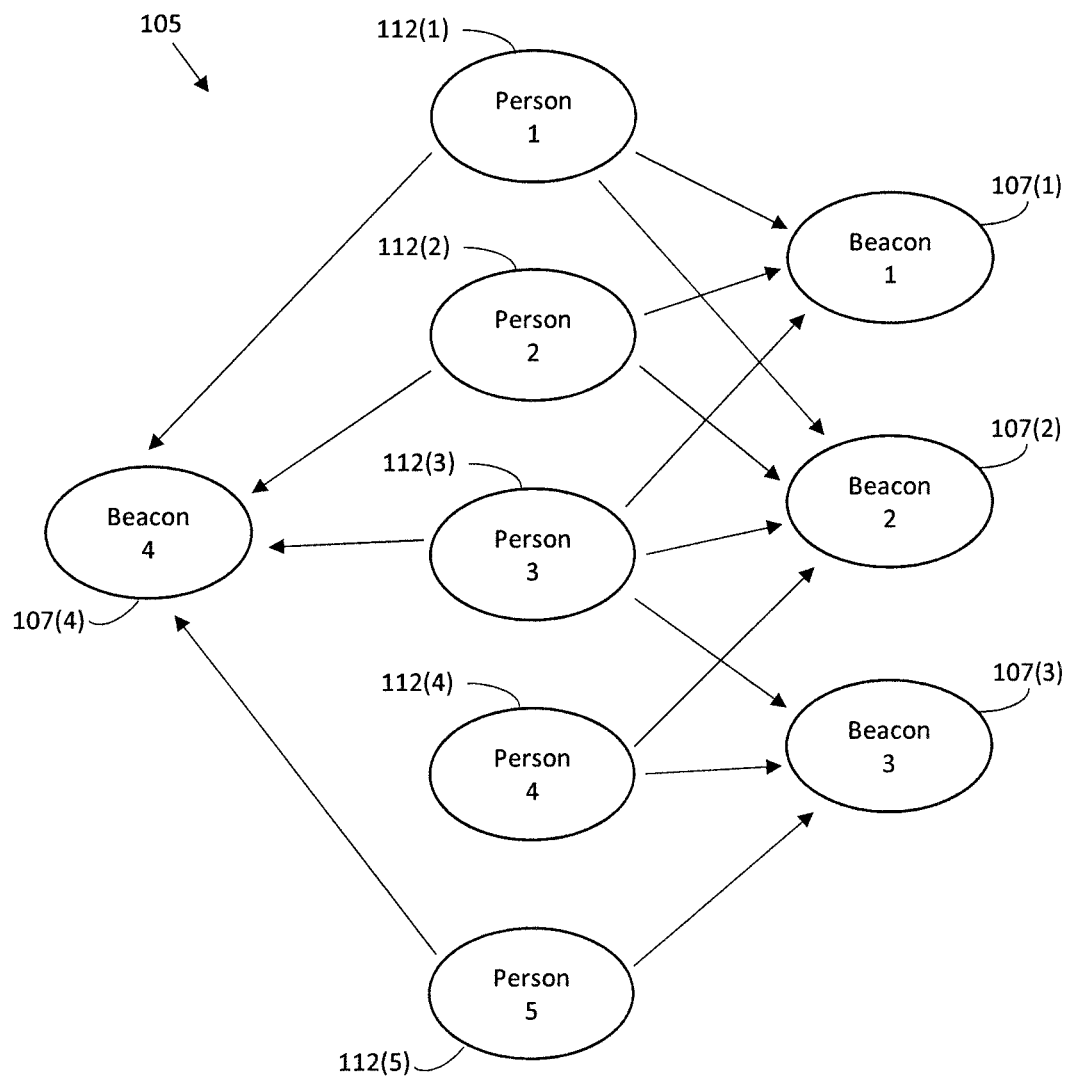
FIG. 4 is an example dependency graph for the IoT devices illustrated in FIG. 1.

The graphing unit 64 uses the relationships and dependencies between the IoT devices 40 as determined by the dependency identification unit 62 to generate a dependency graph. An example dependency graph 105 is provided in FIG. 4. This dependency graph 105 is based on 4 beacons 107(1)-107(4) within a workspace 30. The beacons are to detect devices carried by people within the workspace. In this example, there are 5 people 112(1)-112(5) within the workspace 30.

The 5 people 112(1)-112(5) are sensed by the 3 beacons 107(1)-107(4). Beacon 1 107(1) detects 3 people 112(1)-112(3), beacon 2 107(2) detects 4 people 112(1)-112(4), beacon 3 107(3) detects 3 people 112(3)-112(5), and beacon 4 107(4) detects 4 people 112(1)-112(3) and 112(5).

From the dependency graph 105 weights for each beacon 107(1)-107(4) can be calculated by the weight calculator 66. Based on the dependency graph 107, to sense the presence of 5 people in the workspace 30 the following options are needed as a minimum:

Beacon 1 & 3
Beacon 2 & 3
Beacon 3 & 4
Beacon 2 & 4

Now the weights for each of the IoT devices 40 can be calculated by the weight calculator 66 based on the occurrence of each beacon in the above 4 options:

Beacon 1=0.25
Beacon 2=0.50
Beacon 3=0.75
Beacon 4=0.50

The criticality of each of the IoT devices 40 can be computed proportional to the weight of each IoT device 40 and the stability of the system, as will now be explained. In this example, there are 4 options for the system to be stable.

If beacon 3 107(3) is lost, this would have a huge impact on the stability of the system as it has a higher weight as compared to the weight of the other beacons. If beacon 3 107(3) is lost, it will reduce the number of options for stability from 4 to 1. Hence, in that order, losing beacon 3 107(3) will be a critical issue, losing beacon 2 107(2) or 4 107(4) is a moderate issue, and losing beacon 1 107(1) is of lower importance. An algorithm within the change interpreter 60 will run continuously, and the dependency graph 105 and the weights are to be computed periodically and averaged out, if there are changes in the dependency graph 105.

In addition to calculating the weights for the beacons 107(1)-107(4), the change interpreter 60 also determines a minimum combination of beacons 107(1)-107(4) that are needed to maintain stability of the IoT workspace 30. The criticality calculator 70 uses this minimum combination along with the assigned weights for each IoT device 40 when quantifying the impact of the change in the IoT workspace 30.

As provided by the health monitor 50, the criticality calculator 70 is aware of how many beacons 107(1)-107(4) are in the IoT workspace 30. When all of the beacons 107(1)-107(4) are in the IoT workspace 30, the criticality calculator 70 receives from the change interpreter 60 the assigned weights for the beacons 107(1)-107(4) as well as the minimum combination of beacons 107(1)-107(4) that are needed to maintain stability of the IoT workspace 30.

When one of the beacons 107(1)-107(4) is removed from the IoT workspace 30, the criticality calculator 70 receives notification from the health monitor 50 that there has been a change in the number of beacons 107(1)-107(4). In coordination with this update from the health monitor 50, the criticality calculator 70 receives an update from the change interpreter 60 on the updated assigned weights for remaining beacons as well as an update on the minimum combination of beacons that are needed to maintain stability of the IoT workspace 30.

The criticality calculator 70 compares the update on the assigned weights for the remaining beacons as well the update on the minimum combination of beacons that are needed to maintain stability of the IoT workspace 30 with the weights and minimum combinations of the beacons before the change to quantify an impact of the change in the IoT workspace 30. Based on the impact of the change, the criticality calculator 70 may generate a change criticality message. The change criticality message may indicate that the impact of the change to the IoT workspace 30 is severe, critical, or low impact, for example. The impact of the change in the IoT workspace as quantified by the criticality calculator 70 is reflective on how an overall stability of the IoT workspace 30 is affected.

Figure 5:
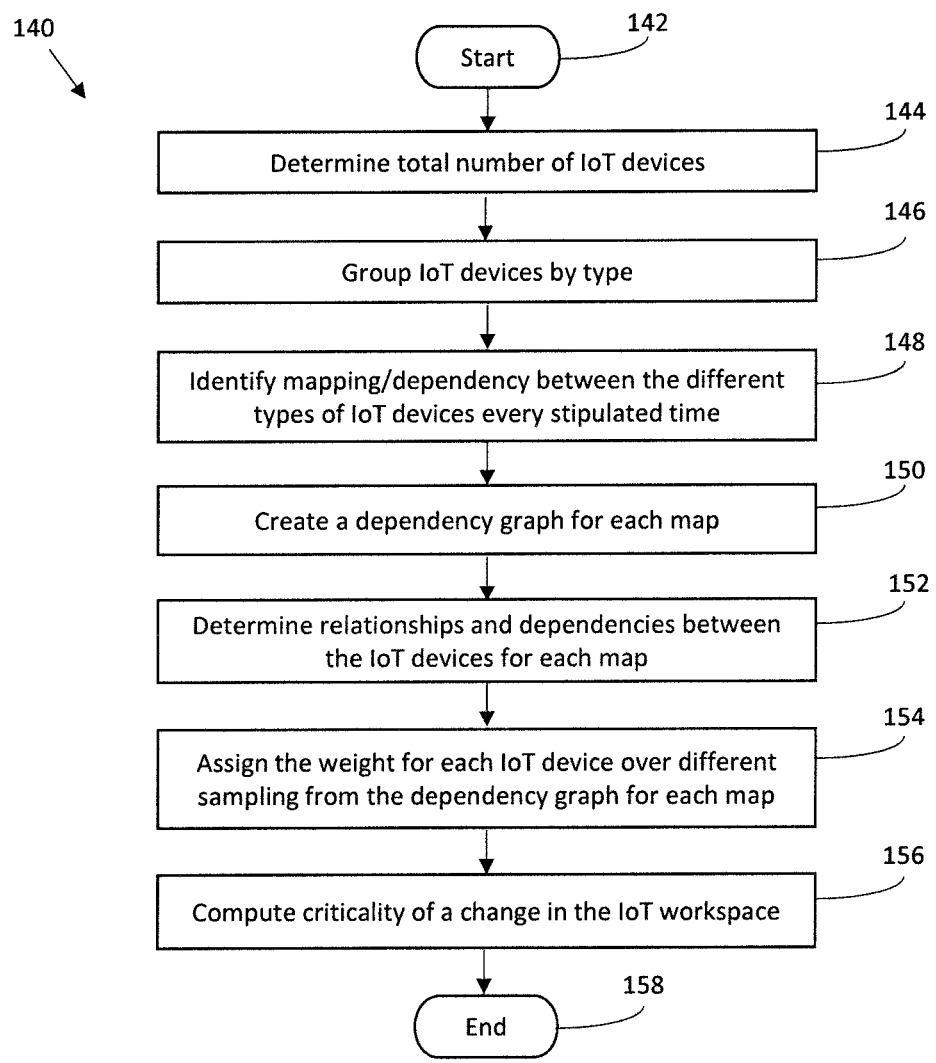
FIG. 5 is a general flowchart illustrating a method for operating the change criticality quantifier illustrated in FIG. 3.

Referring now to the flowchart 140 in FIG. 5, and generally speaking, a method for operating the change criticality quantifier 20 for an IoT workspace 30 is provided. From the start (Block 142), a total number of IoT devices 40 within the IoT workspace 30 is determined at Block 144, and the IoT devices 40 are grouped by type at Block 146. Mapping and dependency between the different types of IoT devices 40 is determined at Block 148 every stipulated time. A dependency graph is created at Block 150 for each map. Relationships and dependencies between the IoT devices 40 for each map are determined at Block 152. A weight for each IoT device 40 is assigned at Block 154 over different sampling from the dependency graph for each map. A criticality of a change in the IoT workspace 30 is computed at Block 156. The method ends at Block 158.

Figure 6:
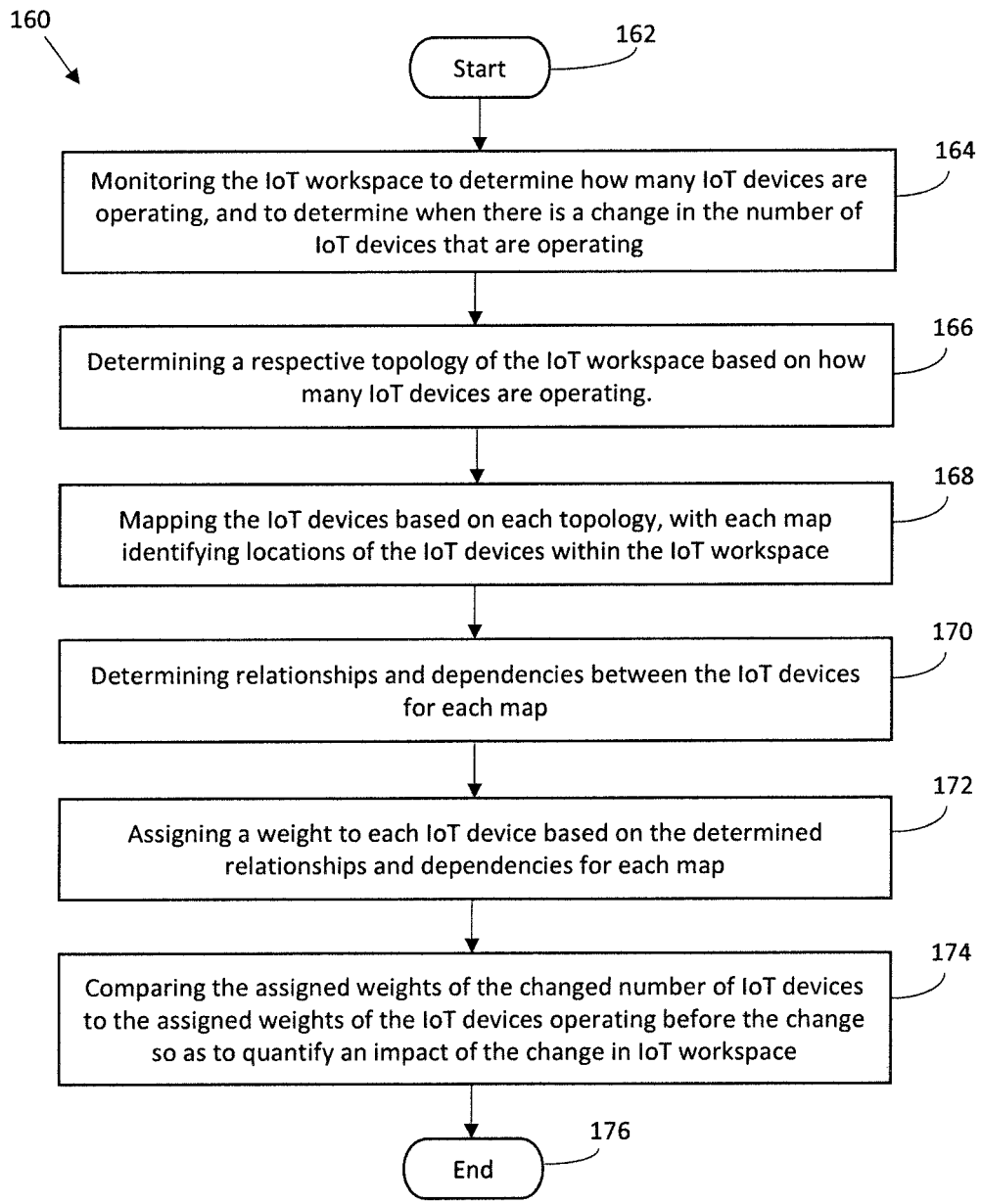
FIG. 6 is a more detailed flowchart illustrating a method for operating the IoT topology analyzer illustrated in FIG. 3.

Referring now to the flowchart 160 in FIG. 6, more detailed steps for operating the change criticality quantifier 20 for the IoT workspace 30 will be discussed. From the start (Block 162), the IoT workspace 30 is monitored at Block 164 to determine how many IoT devices 40 are operating, and to determine when there is a change in the number of IoT devices 40 that are operating. A respective topology of the IoT workspace 30 is determined at Block 166 based on how many IoT devices 40 are operating. The IoT devices 40 are mapped at Block 168 based on each topology, with each map identifying locations of the IoT devices 40 within the IoT workspace 30. Relationships and dependencies between the IoT devices 40 for each map are determined at Block 170. A weight for each IoT device 40 is assigned at Block 172 based on the determined relationships and dependencies for each map. The assigned weights of the changed number of IoT devices 40 are compared at Block 174 to the assigned weights of the IoT devices 40 operating before the change so as to quantify an impact of the change in the IoT workspace 30. The method ends at Block 176.

Yet another aspect is directed to a non-transitory computer readable medium for operating a change criticality quantifier 20 for an IoT workspace 30, and with the non-transitory computer readable medium having a plurality of computer executable instructions for causing the change criticality quantifier 20 to perform steps. The steps include monitoring the IoT workspace 30 to determine how many IoT devices 40 are operating, and to determine when there is a change in the number of IoT devices 40 that are operating; determining a respective topology of the IoT workspace 30 based on how many IoT devices 40 are operating; mapping the IoT devices 40 based on each topology, with each map identifying locations of the IoT devices 40 within the IoT workspace 30; determining relationships and dependencies between the IoT devices 40 for each map; assigning a weight to each IoT device 40 based on the determined relationships and dependencies for each map; and comparing the assigned weights of the changed number of IoT devices 40 to the assigned weights of the IoT devices 40 operating before the change so as to quantify an impact of the change in the IoT workspace 30.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A device for an Internet of Things (IoT) workspace comprising:
   a memory and at least one processor configured to cooperate with said memory to
   monitor the IoT workspace and determine when there is a change in a number of IoT devices operating within the IoT workspace;
   determine a respective topology of the IoT workspace based the number of IoT devices operating in the IoT workspace;
   map the IoT devices based on each topology, with each map identifying locations of the IoT devices within the IoT workspace;
   determine relationships and dependencies between the IoT devices for each map;
   assign a weight to each IoT device based on the determined relationships and dependencies for each map; and
   compare the assigned weights of IoT devices operating in the IoT workspace before the change and after the change so as to quantify an impact of the change in the IoT workspace.

2. The device according to claim 1 wherein the impact of the change in the IoT workspace is reflective on how an overall stability of the IoT workspace is affected.

3. The device according to claim 1 wherein said at least one processor is further configured to determine a minimum combination of IoT devices that are needed to maintain stability of the IoT workspace; and use the minimum combination along with the assigned weights for each IoT device when quantifying the impact of the change in the IoT workspace.

4. The device according to claim 1 wherein said at least one processor is further configured to generate a change criticality message based on the quantified impact of the change in the IoT workspace.

5. The device according to claim 1 wherein said at least one processor is further configured to generate a dependency graph for each map based on the determined relationships and dependencies between the IoT devices; and wherein assigning the weight to each IoT device for each map is also based on the dependency graph.

6. The device according to claim 1 wherein said at least one processor continuously monitors for any change in the IoT workspace.

7. The device according to claim 1 wherein said at least one processor polls the IoT devices within the IoT workspace with a health check command, with each polled IoT device responding with a heartbeat signal that includes their address.

8. A method for operating a device for an Internet of Things (IoT) workspace comprising:
   monitoring the IoT workspace and determine when there is a change in a number of IoT devices operating within the IoT workspace;
   determining a respective topology of the IoT workspace based the number of IoT devices operating in the IoT workspace;
   mapping the IoT devices based on each topology, with each map identifying locations of the IoT devices within the IoT workspace;
   determining relationships and dependencies between the IoT devices for each map;
   assigning a weight to each IoT device based on the determined relationships and dependencies for each map; and
   comparing the assigned weights of IoT devices operating in the IoT workspace before the change and after the change so as to quantify an impact of the change in the IoT workspace.

9. The method according to claim 8 wherein the impact of the change in the IoT workspace as quantified is reflective on how an overall stability of the IoT workspace is affected.

10. The method according to claim 8 further comprising determining a minimum combination of IoT devices that are needed to maintain stability of the IoT workspace; and wherein the minimum combination is used along with the assigned weights for each IoT device when quantifying the impact of the change in the IoT workspace.

11. The method according to claim 8 further comprising generating a change criticality message based on the quantified impact of the change in the IoT workspace.

12. The method according to claim 8 further comprising generating a dependency graph for each map based on the determined relationships and dependencies between the IoT devices; and wherein assigning the weight to each IoT device for each map is also based on the dependency graph.

13. The method according to claim 8 wherein the IoT workspace is continuously monitored for any change in the IoT workspace, and when there is a change, the comparing is performed.

14. A non-transitory computer readable medium for operating a device for an Internet of Things (IoT) workspace, and with the non-transitory computer readable medium having a plurality of computer executable instructions for causing the device to perform steps comprising:
   monitoring the IoT workspace and determine when there is a change in a number of IoT devices operating within the IoT workspace;

monitoring the IoT workspace to determine how many IoT devices are operating, and to determine when there is a change in the number of IoT devices that are operating;

determining a respective topology of the IoT workspace based the number of IoT devices operating in the IoT workspace;

mapping the IoT devices based on each topology, with each map identifying locations of the IoT devices within the IoT workspace;

determining relationships and dependencies between the IoT devices for each map;

assigning a weight to each IoT device based on the determined relationships and dependencies for each map; and comparing the assigned weights of IoT devices operating in the IoT workspace before the change and after the change so as to quantify an impact of the change in the IoT workspace.

15. The non-transitory computer readable medium according to claim 14 wherein the impact of the change in the IoT workspace as quantified is reflective on how an overall stability of the IoT workspace is affected.

16. The non-transitory computer readable medium according to claim 14 further comprising determining a minimum combination of IoT devices that are needed to maintain stability of the IoT workspace; and wherein the minimum combination is used along with the assigned weights for each IoT device when quantifying the impact of the change in the IoT workspace.

17. The non-transitory computer readable medium according to claim 14 further comprising generating a change criticality message based on the quantified impact of the change in the IoT workspace.

18. The non-transitory computer readable medium according to claim 14 further comprising generating a dependency graph for each map based on the determined relationships and dependencies between the IoT devices; and wherein assigning the weight to each IoT device for each map is also based on the dependency graph.

19. The non-transitory computer readable medium according to claim 14 wherein the IoT workspace is continuously monitored for any change in the IoT workspace, and when there is a change, the comparing is performed.

* * * * *